E. TELLESON.
WHEEL MOUNT.
APPLICATION FILED DEC. 19, 1913.
1,098,464.
Patented June 2, 1914.
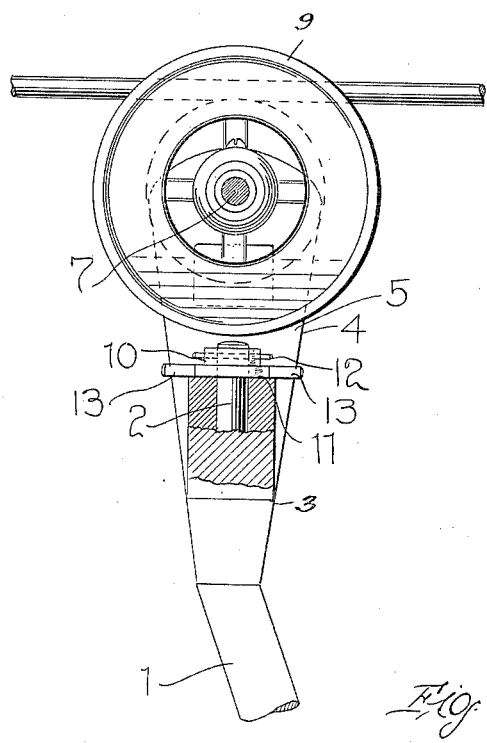
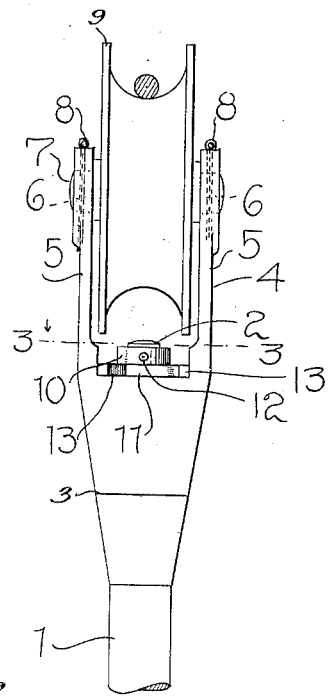
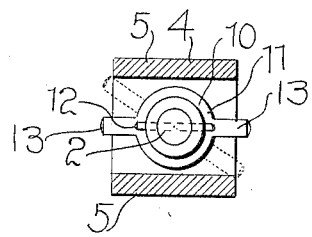
Inventor
EDWARD TELLESON
Witnesses
Robert M. Sutphin
A. J. Hind
By Watson E. Coleman
Attorney

UNITED STATES PATENT OFFICE.

EDWARD TELLESON, OF BINGHAMTON, NEW YORK.

WHEEL-MOUNT.

1,098,464.  Specification of Letters Patent.  Patented June 2, 1914.

Application filed December 19, 1913. Serial No. 807,750.

*To all whom it may concern:*

Be it known that I, EDWARD TELLESON, a citizen of the United States, residing at Binghamton, in the county of Broome and State of New York, have invented certain new and useful Improvements in Wheel-Mounts, of which the following is a specification, reference being had to the accompanying drawings.

This invention relates to new and useful improvements in trolley heads and more particularly to a removable head of this character, the main object of the invention is the provision of a trolley head which is rotatably mounted so that the same will readily rotate upon the trolley pole in rounding curves or sharp corners and is also provided with means whereby the aforesaid rotary movement is limited in either direction.

Another object of the present invention is the provision of a trolley head of the above character which will possess advantages in points of durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a side elevation of a trolley head constructed in accordance with my invention, parts thereof being broken away and in section; Fig. 2 is a front elevation of the trolley head; Fig. 3 is a transverse sectional view taken on the line 3—3 of Fig. 2.

Referring more particularly to the drawings, 1 indicates the trolley pole which is provided at its upper end with a reduced shank 2 forming an annular shoulder 3. Rotatably mounted upon the shank 2 is a trolley head 4, the inner end of which is adapted to rest upon the shoulder 3. The trolley head 4 is provided with spaced side ears 5 having alined bearing openings 6 formed therein in which the ends of the shaft 7 are mounted and securely held in position by means of the cotter pins 8. Mounted upon the shaft 7 and disposed between the ears 5 is the trolley wheel 9.

In order to retain the trolley head upon the pole 1 the shank 2 projects upwardly between the spaced ears 5 and mounted thereon is a washer 10, the lower end of which is provided with an annular flange 11 adapted to bear upon the upper face of the trolley head 4 between the ears 5 and the washer 10 is securely held in place by means of the transverse pin 12 which extends through the washer and through the upper end of the shank 2. The flange 11 on the washer 10 is provided with two outwardly projecting arms 13 which are arranged at diametrically opposite points upon the flange 11 and are adapted to alternately engage with the sides of the ears 5 to limit the rotary movement of the trolley head.

From the above description taken in connection with the accompanying drawings, it will be readily apparent that I have provided a simple and durable trolley head which can be quickly and readily applied to the trolley head or removed therefrom by means of the removable pin 12 which is inserted through the washer 10 and the upper end of the shank 2. Furthermore, in the turning of a corner or rounding of a curve, the trolley wheel will readily rotate to conform to the curvature of the track. In rounding a curve in one direction, the arms 13 engage the ears 5 upon one side thereof while in rounding the curve in the opposite direction they will engage the ears on the opposite side.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a trolley pole having a reduced shank at its upper end forming an annular shoulder at the inner end of the shank, a trolley head rotatably mounted upon said shank and having its inner end bearing upon said shoulder, spaced ears formed integral with said head, a trolley wheel mounted therebetween, a washer removably mounted upon the upper end of the shank between said ears, and diametrically disposed arms formed integral with the washer and alternately engaging the side ears upon the rotation of the trolley head, to limit the rotary movement of the trolley head in either direction.

2. A device of the class described including a trolley pole, a reduced shank formed at the outer end thereof and providing an annular shoulder at the inner end of the shank, a trolley head rotatably mounted upon the shank and having its inner end bearing upon said shoulder, spaced ears formed on said trolley head, a trolley wheel mounted between the outer ends of said ears, a washer member mounted upon the upper end of the shank and arranged between said ears, an outwardly projecting flange formed on said washer, a removable pin disposed through the washer and shank to retain the trolley head thereon and diametrically opposed arms formed on said washer adapted to alternately engage the spaced ears to limit the rotary movement of the head.

In testimony whereof I hereunto affix my signature in the presence of two witnesses.

EDWARD TELLESON.

Witnesses:
B. M. THOMPSON,
GEORGE E. LORD.

---

Copies of this patent may be obtained for five cents each, by addressing the "Commissioner of Patents, Washington, D. C."